Patented Dec. 4, 1951

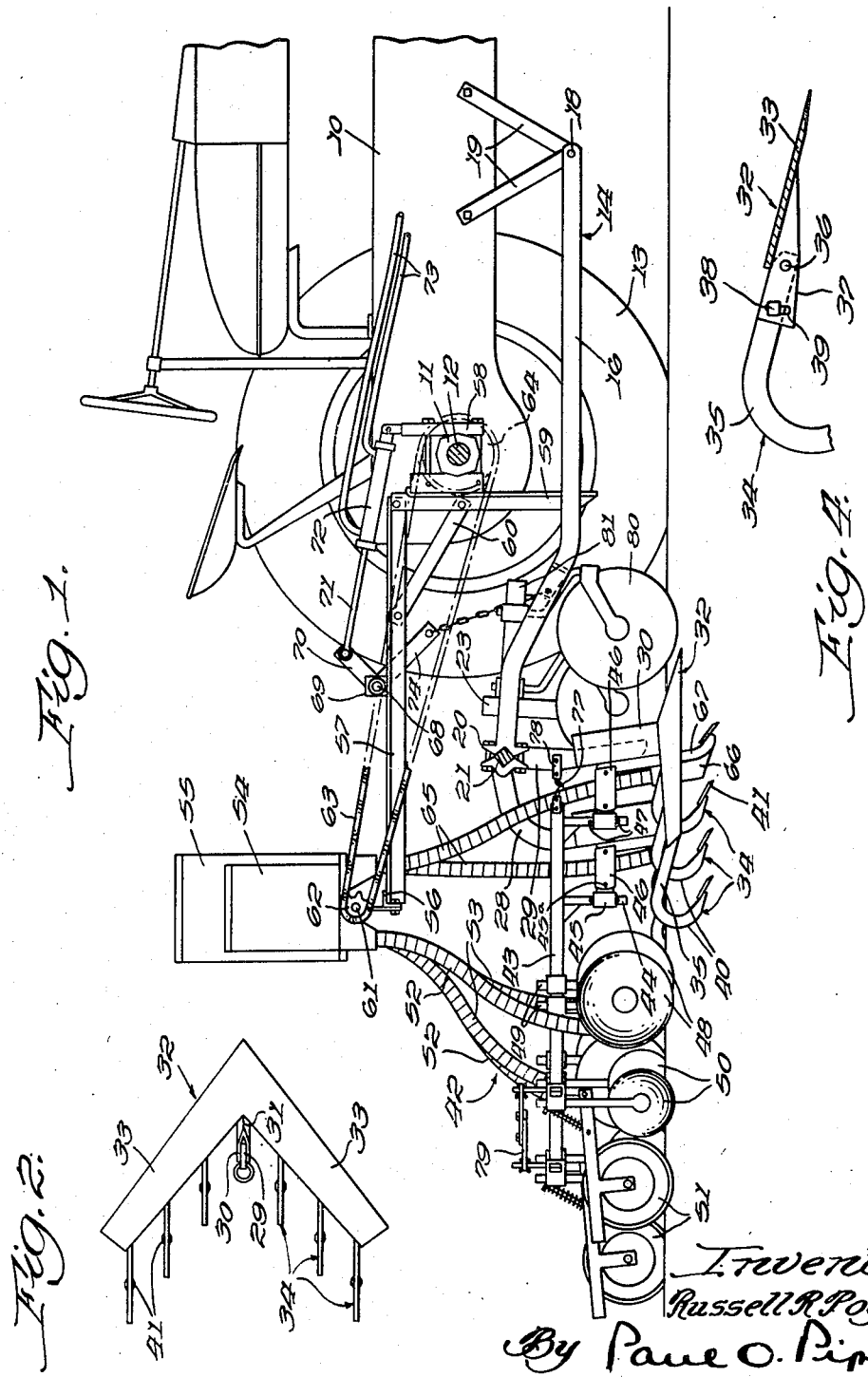

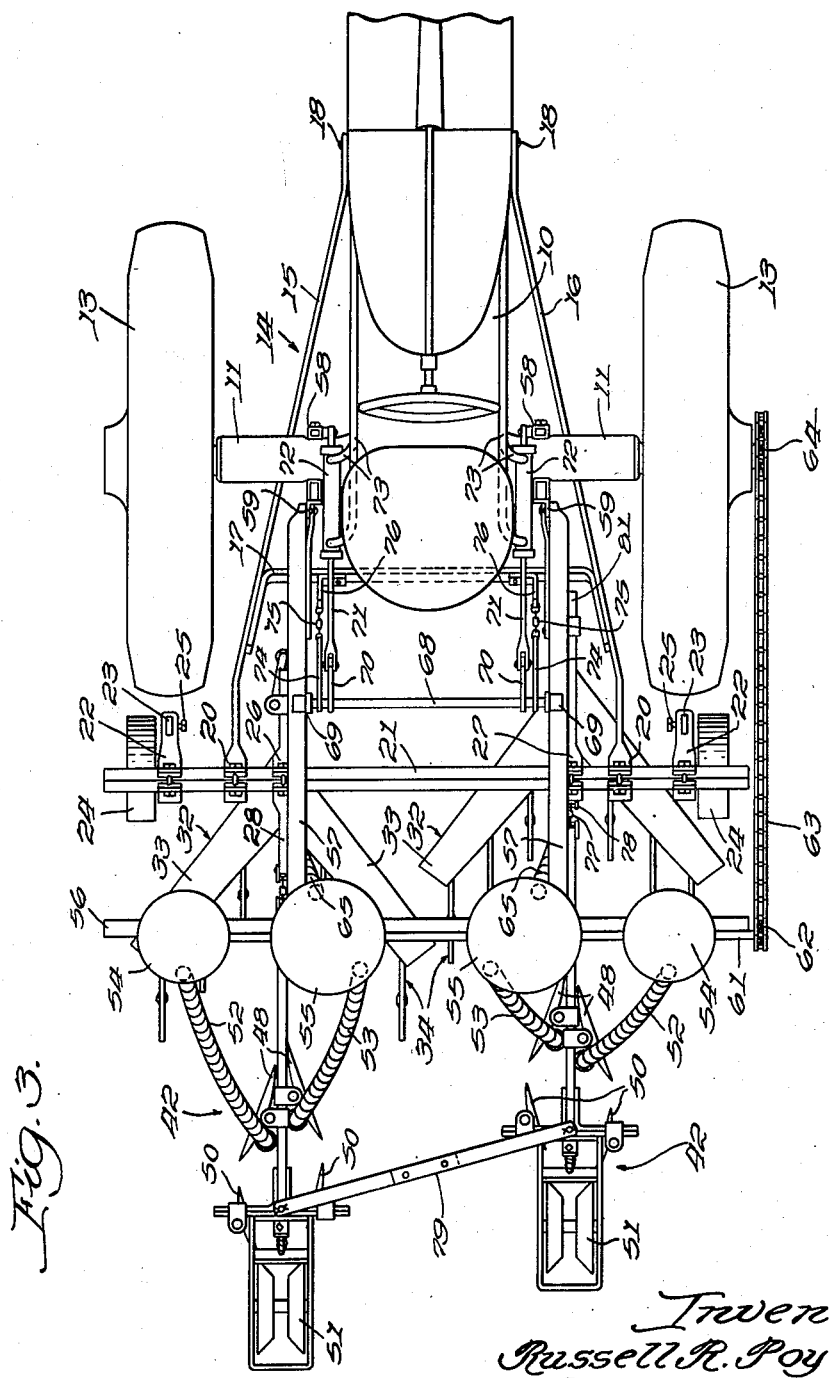

2,577,363

UNITED STATES PATENT OFFICE 2,577,363

MULCH-TILLER-PLANTER

Russell R. Poynor, Canton, Ill., assignor to International Harvester Company, a corporation of New Jersey Application January 17, 1947, Serial No. 722,624

5 Claims. (Cl. 111—59)

This invention relates to agricultural implements, and particularly to an implement especially adapted for use in hilly sections of the country as well as in arid or semi-arid regions where erosion control and conservation of moisture are determining factors in successful farming operations. More specifically, the invention concerns a machine for practicing so-called stubble-mulch farming, an agricultural technique designed to till the soil while maintaining a mulch thereon to conserve moisture and inhibit the erosion of the soil by water and wind.

The value of stubble-mulch farming has been recognized for some years and it has been frequently practiced in some regions. Customarily the soil upon which a previous crop's stubble still remains is not plowed in the usual way but is gone over with a tool designed to kill the roots of the weed and crop remnants. Since the tool can travel only a few inches below the surface of the ground if the roots are to be killed, the ground is traversed a second time at a greater depth so that the soil will be better prepared to hold moisture. Planting the tilled soil is then done in a third operation.

An object of the present invention is to provide a machine which performs the three aforementioned steps in one operation; that is, it kills the growth, tills the ground to the desired depth, and plants and fertilizes the new crop, while leaving a protective mulch of stubble on the surface of the ground.

Another object of the invention is to provide a combination mulch-tiller and planter having means for severing the roots of the stubble and simultaneously tilling the soil to the depth desired for proper conservation of moisture.

Other objects and advantages of the invention will become clear from the following detailed description when read in conjunction with the accompanying drawings, wherein:

Figure 1 is a side elevation of the rear end of a tractor with one wheel removed and showing an implement embodying the features of the present invention connected thereto;

Figure 2 is a plan view of one of the tillage blades or sweeps;

Figure 3 is a plan view of the structure shown in Figure 1; and

Figure 4 is a detail of the connection of the tiller or toothed member to the sweep blade.

Referring to the drawings, the tractor upon which the implement embodying the features of this invention is mounted is provided with a longitudinally extending body 10 and a transverse rear axle structure 11, journalling axle 12 upon which are mounted rear drive wheels 13.

The implement shown in the drawings is a combination mulch tiller and planter and is connected to the tractor in draft receiving relation thereto by a hitch structure generally indicated at 14 and comprising laterally spaced forwardly converging beams 15 and 16 connected by a brace 17 to form a rigid hitch structure. The forward ends of the beams 15 and 16 are pivotally connected at 18 to a pair of straps 19 secured to the tractor body. A pair of these straps 19 is provided at each side of the tractor body 10 for the pivotal connection thereto of the forward ends of beams 15 and 16. The beams 15 and 16 extend from a location in advance of the rear axle structure 11 to a location rearwardly of the drive wheels 13. Each of these beams terminates in a clamp 20 serving for the rigid connection to the hitch structure of a transversely extending tool bar 21 which is square in cross section and has secured adjacent each end a bracket 22 apertured to slidably receive for vertical adjustment a standard 23 carrying a gauge wheel 24. Standard 23 is vertically adjustable to regulate the position of the wheel 24 with respect to the beam 21 and is held in adjutsed position by a set screw 25.

Affixed to the tool bar 21 by means of clamps 26 and 27 at laterally spaced locations thereon are tool beams or standards 28 and 29. Standard 28 differs from standard 29 only in that the latter is arranged substantially vertically while standard 28 has a rearwardly bent portion in order to position the vertically extending shank thereof somewhat rearwardly of the standard 29 to accommodate some overlapping of the earth working tools carried thereby.

Affixed to the lower portion of the standard is a U-shaped vertically extending member 30 provided with a forward edge 31 and to the lower end of which is affixed a tillage blade in the form of a sweep 32 having rearwardly diverging wings 33. Wings 33 are relatively flattened, and have forward cutting edges. The wings are positioned in rearwardly diverging upwardly and rearwardly inclined planes. Thus the cutting edges of the blade 32 penetrate below the surface of the ground and, due to the upward and rearward inclination of the wings 33, the earth or sod under which the blade is travelling is lifted.

As pointed out before, the implement of this invention is adapted for the practice of stubble mulch farming, that is, the remnants of the previous crop are allowed to premain upon the surface of the ground in order to minimize the possibility of erosion as well as to conserve moisture, but the roots of the existing vegetation must be killed in preparation for the new crop. Therefore, the sweep blade 32 is operated at a depth below the surface of the ground sufficient only to insure the severance of the roots. However, in order to further promote the conservation of moisture and to properly till the soil to a suitable depth, additional means are provided in the form of tooth members 34.

Each of the tillers or tooth members 34 comprises a shank portion 35 which is connected at its forward end by a pivot pin 36 to a plate 37 secured to the undersurface of the wing portion of the blade 33. The shank 35 is also provided with a bolt 38 receivable in a slot 39 in the plate 37. The shank portion 35 extends rearwardly from the wing portion 33 of the blade and lies substantially in the inclined plane thereof, the purpose of which will hereinafter become clear. Each of the tooth members 34 is provided with a downwardly and forwardly curved portion 40 which extends well below the blade 32 and which has secured to the end thereof a shovel 41. The shovels 41 are adapted to penetrate the soil several inches below the level of operation of the blade 32 and thus till the soil at a proper depth while at the same time the roots of the stubble are being severed by the sweep.

In passing through the soil below the stubble, the roots of the stubble are severed and the sod is lifted, the angle at which the wings 33 of the blade are set causing the sod to rise and pass over the rear edge thereof, insuring a thorough separation of the sod from the soil underneath. The tooth members 34 extend parallel to each other and to the line of travel of the implement and the layer of sod carried over the rear edge of the wings 33 of the blade are further lifted and separated from the soil therebelow by the shank portions 35 of the tooth members 34. Likewise, due to the spacing of the tooth members 34, soil clinging to the roots of the stubble which has been uprooted by the sweep blade is loosened and falls therefrom, promoting the destruction of the root system. The stubble is then deposited rearwardly of the tooth members 34 upon the ground.

The soil which has been properly prepared by the sweep 32 is now ready for the new crop, and is planted by a planter unit generally indicated at 42 which comprises a longitudinally extending frame bar 43 which is provided adjacent its forward end and on the undersurface thereof with a vertically extending spindle 44 rotatably received in a bearing member 45 pivoted at 45a upon a bracket 46 affixed to the standard 29. It may be understood at this point that while the standard 28 is somewhat differently shaped from standard 29, the tillage and planting structure associated therewith are substantially duplicates of the tillage and planting structure associated with the standard 29 and a descripion of one will suffice for both.

The planting unit 42, therefore, is pivotally connected to the standard 29 for lateral swinging movement with respect thereto and with respect to the sweep 32. The spindle 44 is held against vertical displacement from the bearing member 45 by the provision of cotter keys 47. The pivotal connection between bearing member 45 and bracket 46 accommodates vertical play of the planter unit 42 with respect to the standard 29. A pair of disc furrow openers 48 are mounted upon standards 49 secured to the frame bar 43. Likewise mounted upon the frame bar 43 adjacent its rear end are a pair of coverer discs 50 and a press wheel 51.

Seed and fertilizer are deposited in the furrows formed by the opener discs 48 and are dispensed thereto through flexible tubes 52 and 53 from containers 54 and 55 respectively. Seed and fertilizer containers 54 and 55 are mounted upon a transverse bar 56 having laterally spaced longitudinally extending angle bars 57 affixed thereto and connected at their forward ends to brackets 58 mounted upon the rear axle structure 11 at opposite sides of the tractor body 10. The angle bars 57 are affixed to the brackets 58 through the intermediary of vertically extending bars 59 secured to the brackets 58 and braced by straps 60 affixed to the bars 57 and 59. The seed and fertilizer dispensers are driven through the intermediary of a transverse drive shaft 61 mounted upon the transverse bar 56 and provided at one end with a sprocket wheel 62 which is drivably connected by an endless chain 63 with a sprocket wheel 64 mounted upon the laterally projecting end of the axle 12 of the tractor. Additional fertilizer is dispensed from the container 55 through a flexible tube 65 which is held in place by the bracket 46 secured to the standard 29. The lower end of the tube 65 is provided with a boot 66 through which fertilizer is deposited in a furrow formed by a fertilizer opener 67 also affixed to the standard 29. A furrow is formed by the opener 67 at substantially the same depth as the tooth members 34 and occupies the space between the members 34 attached to the wings 33 of the sweep blade so that fertilizer is provided in the soil at a depth well below the seed and fertilizer deposited through the flexible tubes 52 and 53. Due to their position laterally and rearwardly of the opener 67, the forwardmost members 34, in addition to functioning to till the soil, likewise act as coverers for the fertilizer.

The entire implement is vertically moved between operating and transport positions with respect to the tractor by lifting mechanism which includes a transverse rock shaft 68 rockably mounted in openings provided in brackets 69, and is provided at laterally spaced locations adjacent the ends thereof with rock arms 70. Each of the rock arms 70 is connected to the piston rod 71 of a hydraulic cylinder 72 which is pivotally connected to the bracket 58. Fluid is supplied to the cylinders 72 to actuate them through conduits 73 from a source (not shown) deriving power from the tractor. Operation of the cylinder 72 acts through the arm 70 to rock shaft 68, which is further provided adjacent its ends with forwardly and downwardly extending rock arms 74, each of which is connected by a chain 75 with a lug 76 secured to the transverse brace member 17 of the hitch structure 14. Thus rocking of the shaft 68 acts through the arm 70 and chains 75 to raise and lower the implement with respect to the tractor.

It has already been noted that the planter units 42 are pivotally connected to the standards 28 and 29 to permit lateral swinging thereof with respect to the standard and the sweep. However, only limited lateral swinging of the planter unit is desired and this in the operating position of the implement. It has also been pointed out that due to the pivotal connection of the bearing 45 to the bracket 46 the planter unit has a certain amount of vertical play with respect to the tool standards. The forward end of the frame bar 43 of the planter unit is connected by a flexible chain 77 to a lug 78 secured to the standard 29. Slack is introduced into this chain as indicated in Figure 1 when the implement is in its earth working position. Likewise, in this position the planter unit is permitted a certain amount of lateral swinging about the pivot received by the spindle 44, such swinging movement being limited by the taking up of the slack in the chain 77 as the unit swings. Upon raising the implement to its transport position upon the tractor, the slack is taken up in the chain 77 and the planter unit is restrained from lateral swinging. It may be noted that in operation the two planter units 42 are held against relative lateral movement with respect to each other by a spacer bar 79.

Conventional rolling colters 80 are provided in advance of the standards 28 and 29 to open a path therefor, and are carried by bars 81 extending forwardly from the clamps 26 and 27.

Having described the invention, it should be understood that while the invention has been described in its preferred embodiment, various modifications may be made therein without departing from the spirit of the invention or the scope of the appended claims.

What is claimed is:

1. The combination with a tractor of an agricultural implement comprising a tool support, means for raising and lowering the support with respect to the tractor, a tool standard carried by the support, a cultivator blade secured to the standard arranged to penetrate the soil at a relatively shallow depth, a fertilizer opener carried by the standard to penetrate the soil at a greater depth than the cultivator blade, means carried by the standard for depositing fertilizer in the furrow formed by said opener, a planter unit mounted rearwardly of said standard for vertical movement therewith including a longitudinally extending frame and connecting means between the forward end of the frame and the standard operative in the lowered position of the implement to accommodate lateral swinging of the planter unit relative to the standard, and said connecting means being operative in the raised position to restrain such lateral swinging of the planter unit.

2. The combination with a tractor of an agricultural implement comprising a tool support, means for raising and lowering the support with respect to the tractor, a tool standard carried by the support, a cultivator blade secured to the standard arranged to penetrate the soil at a relatively shallow depth, a fertilizer opener carried by the standard to penetrate the soil at a greater depth than the cultivator blade, means carried by the standard for depositing fertilizer in the furrow formed by said opener, a planter unit mounted rearwardly of said standard for vertical movement therewith including a longitudinally extending frame, means pivotally connecting the forward end of the frame to the standard for lateral swinging of the frame with respect thereto, and a separate flexible connection between the planter and the standard arranged to limit lateral swinging of the planter in lowered or operating position and to prevent lateral swinging in raised or inoperative position.

3. In an agricultural implement adapted for attachment to a tractor, a tool support connected to the tractor for generally vertical movement with respect thereto, lift means on the tractor for raising and lowering the support, a cultivator shovel secured to the support arranged to penetrate the soil at a relatively shallow depth, a fertilizer opener carried by the support arranged to penetrate the soil at a greater depth than the cultivator shovel, a planter unit mounted upon said support rearwardly of the cultivator shovel for vertical movement therewith upon raising or lowering the support and including a longitudinally extending frame, a planter furrow opener carried by the frame, means pivotally connecting the forward end of the frame to the support for lateral swinging of the planter unit with respect thereto, dispensing means carried by the tractor and driven therefrom, and means for directing fertilizer and seed respectively to the furrows formed by the fertilizer opener and the planter furrow opener.

4. In an agricultural implement adapted for attachment to a tractor, a tool support connected to the tractor for generally vertical movement with respect thereto, lift means on the tractor for raising and lowering the support, a cultivator shovel secured to the support arranged to penetrate the soil at a relatively shallow depth, a fertilizer opener carried by the support arranged to penetrate the soil at a greater depth than the cultivator shovel, a planter unit mounted upon said support rearwardly of the cultivator shovel for vertical movement therewith upon raising or lowering the support and including a longitudinally extending frame, a planter furrow opener carried by the frame, means pivotally connecting the forward end of the frame to the support for lateral swinging of the planter unit with respect thereto, dispensing means carried by the tractor and driven therefrom, means for directing fertilizer and seed respectively to the furrows formed by the fertilizer opener and the planter furrow opener, and means for holding the planter unit against lateral swinging when in raised position.

5. In an agricultural implement adapted for attachment to a tractor, a tool support connected to the tractor for generally vertical movement with respect thereto, lift means on the tractor for raising and lowering the support, a cultivator shovel secured to the support arranged to penetrate the soil at a relatively shallow depth, a fertilizer opener carried by the support arranged to penetrate the soil at a greater depth than the cultivator shovel, a planter unit mounted upon said support rearwardly of the cultivator shovel for vertical movement therewith upon raising or lowering the support and including a longitudinally extending frame, a planter furrow opener carried by the frame, means pivotally connecting the forward end of the frame to the support for lateral swinging of the planter unit with respect thereto, dispensing means carried by the tractor and driven therefrom, means for directing fertilizer and seed respectively to the furrows formed by the fertilizer opener and the planter furrow opener, and means for holding the planter unit against lateral swinging when in raised position, said holding means being ineffective to oppose lateral swinging of the planter unit relative to the support when the implement is in operating position.

RUSSELL R. POYNOR.

REFERENCES CITED

The following references are of record in the file of this patent:

UNITED STATES PATENTS

| Number | Name | Date |
| --- | --- | --- |
| 627,520 | Packham | June 27, 1899 |
| 1,567,964 | McCasland | Dec. 29, 1925 |
| 1,864,122 | Cole | June 21, 1932 |
| 1,940,992 | Beall | Dec. 26, 1933 |
| 1,962,393 | Horton et al. | June 12, 1934 |
| 2,230,331 | Mobley | Feb. 4, 1941 |
| 2,247,534 | Von Schlegell | July 1, 1941 |
| 2,262,546 | Donoho et al. | Nov. 11, 1941 |
| 2,336,410 | McKay | Dec. 7, 1943 |
| 2,376,559 | Smith | May 22, 1945 |

OTHER REFERENCES

Farmer's Bulletin No. 1997, U. S. Department of Agriculture, June 1948.